Dec. 17, 1957    J. C. DANLY ET AL    2,816,635
POWER PRESS CONTROL
Filed Dec. 12, 1955
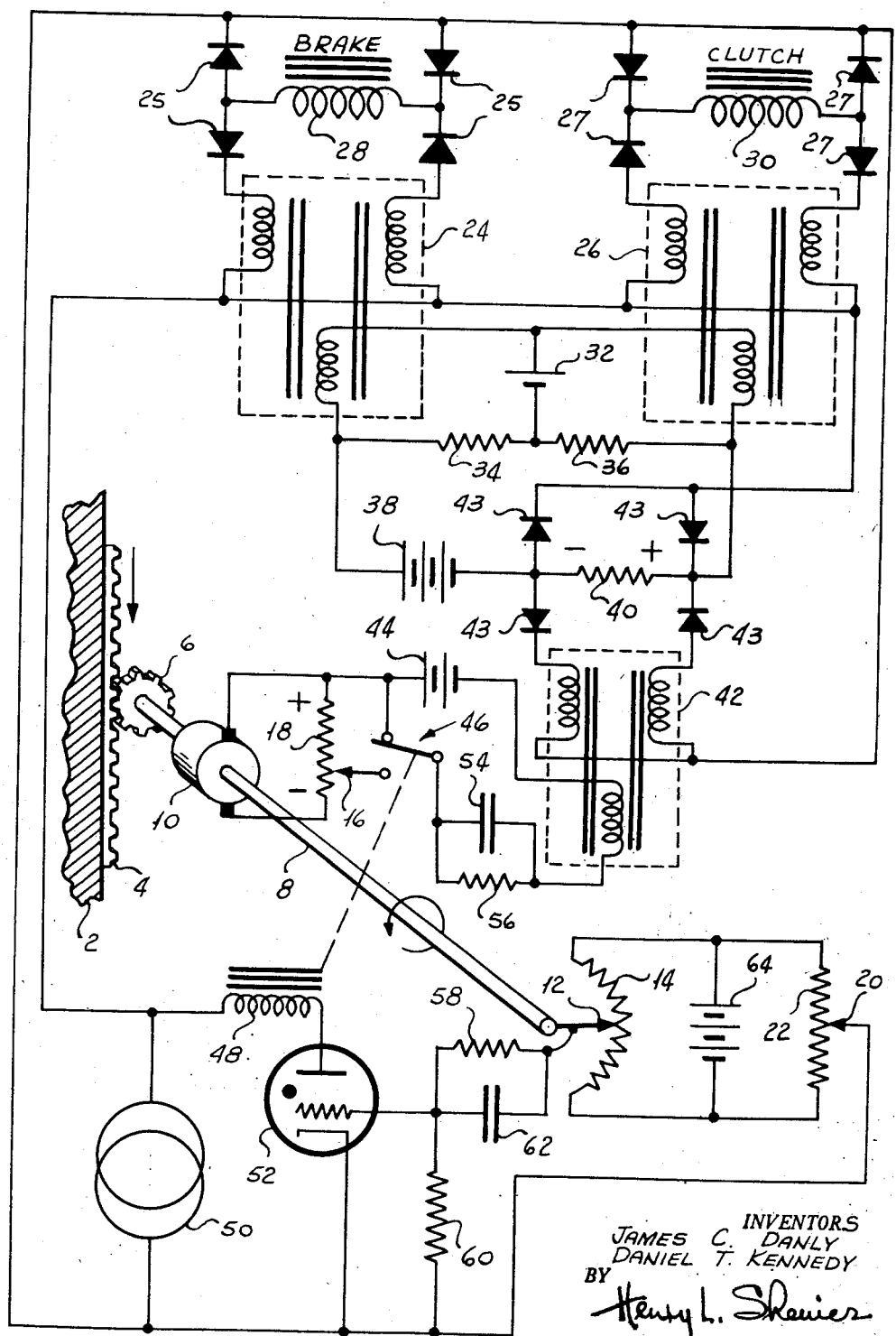
INVENTORS
JAMES C. DANLY
DANIEL T. KENNEDY
BY
Henry L. Shenier
ATTORNEY

United States Patent Office 2,816,635
Patented Dec. 17, 1957

2,816,635

POWER PRESS CONTROL

James C. Danly, River Forest, and Daniel T. Kennedy, La Grange Park, Ill., assignors to Danly Machine Specialties, Inc., Chicago, Ill., a corporation of Illinois Application December 12, 1955, Serial No. 552,643

24 Claims. (Cl. 192—12)

Our invention relates to power press controls and more particularly to a selective and proportional clutch and brake control for power presses.

As is well known in the art, a power press has a frame, a working slide or ram which reciprocates in the frame, an eccentric and a pitman for driving the ram, an electric motor which drives a flywheel to store kinetic energy, a reduction gear train to drive the eccentric, a clutch to transfer power from the flywheel to the gear train, and a brake to retard the motion of the ram. Since a power press is a large, heavy, and expensive piece of machinery, it would be desirable, if possible, to operate the machine constantly at high speed in order to increase the work output of the machine. However, in drawing operations there is a certain critical speed dependent upon the nature of the material which cannot be exceeded, otherwise, the work will tear. This limitation, therefore, dictates that the velocity of the slide be controlled so that it is operated at high speed up to a point of "slowdown" and then slowed down to this critical speed just before engaging the work. Flexibility of control is obtained by the use of a clutch and a brake rather than by regulating the speed of the prime mover. An electric motor of inherently poor speed regulation supplies the average power required by the work plus a friction allowance, and the flywheel supplies the peak power demand so that excessive line currents are not drawn and a smaller prime mover may be used. Common types of proportional brakes and clutches in present use include hydraulically and electro-mechanically actuated friction types, hydraulic fluid couplings, and hysteresis, magnetic particle and eddy current types.

The problem of proportional control of the clutch and brake for power presses is one which up to this point has not been satisfactorily solved. Heretofore means for controlling the clutch and brake have included a pneumatic timer operated by a limit switch which in turn is actuated by a cam adjustably associated with the working slide. This pneumatic timer completely disengages or de-energizes the clutch and completely engages or energizes the brake for a certain time quickly to slow down the slide to below the critical speed then completely de-energizes or disengages the brake and partially re-energizes or re-engages the clutch to drive the slide during the drawing operation. This implicit method of control depends upon the accuracy of a pneumatic timer, which is sensitive to temperature and pressure and subject to sticking of its needle valve and, hence, is inherently inaccurate. Other methods may include electrical timers and, although these in themselves are accurate, they do not afford an accurate solution to the problem of proportional control of the speed of the working slide. As a matter of fact, in some instances of the prior art, the brake is left partially engaged or energized during draw thus requiring a larger prime mover because of the wasteful expenditure of slip energy. If the slide arrives at the work with excessive speed, it will cause tearing; if it arrives with insufficient speed, it might result in a stuck press, with the resultant delay, trouble, and expense of clearing it. Furthermore, in the prior art the speed during draw is not held constant for two reasons. First, the slip of the clutch during the draw operation, if the partial energization is held constant, depends upon the resistance of the work. Since this resistance naturally changes during the stroke, the speed of the ram will therefore vary accordingly. Secondly, even were the slip of the clutch held constant, the motion of the ram would be essentially sinusoidal because of the action of the eccentric and pitman in driving the working slide. In the prior art, therefore, the drawing speed after slowdown is left largely to chance and to constant adjustment. Also, it is inconvenient to adjust a cam to determine the point of slowdown.

One object of our invention is to provide a clutch and brake control for power presses in which the speed of the working slide during the drawing operation is not dependent upon the resistance of the work.

Another object of our invention is to provide a clutch and brake control for power presses in which the speed of the slide is not determined by the essentially sinusoidal motion inherently imparted by the eccentric and pitman link.

A further object of our invention is to provide a clutch and brake control for power presses in which the speed of the working slide during the draw operation is closely regulated and maintained constant.

A still further object of our invention is to provide a clutch and brake control for power presses in which the speed of the ram is maximum during all but the drawing operation so as to increase the work output of the machine.

Another object of our invention is to provide a clutch and brake control for power presses in which the point of slowdown, just before the drawing operation, can be conveniently adjusted.

Other and further objects of our invention will appear from the following description.

In general, our invention contemplates the provision of a tachometer generator whose speed of rotation and hence output voltage are directly proportional to the linear velocity of the working slide, the comparison of its output voltage with a reference voltage and the amplification of the resultant difference to control the clutch and brake. Our invention further contemplates the provision of a potentiometer whose output voltage is a linear function of the position of the working slide, the comparison of this output voltage with a reference voltage and the use of the difference voltage to initiate the operation of control by the tachometer generator.

The accompanying drawing, which forms part of the instant specification and which is to be read in conjunction therewith, is a schematic view showing one embodiment of our invention.

More particularly referring now to the drawing, a working slide 2 has mounted upon it a rack 4, which drives a pinion 6 and a shaft 8 carrying it. Mounted on the shaft 8 are the armature of a direct current tachometer generator 10 and the brush 12 of a first position potentiometer 14. A suitable source of alternating current potential, such as alternator 50, supplies excitation for magnetic amplifiers 24, 26, and 42, each having two output windings and a control winding. Magnetic amplifier 24 has its two output windings connected in a full wave bridge circuit by crystals 25 to energize a brake control coil 28. Magnetic amplifier 26 has its two output windings connected in a full wave bridge circuit by crystals 27 to operate clutch control coil 30. We conveniently use eddy current couplings, such as are made by the Dynamatic Division of the Eaton Manufacturing Company, Kenosha, Wisconsin, or other eddy current couplings known to the art, since eddy current couplings can dissipate the large amount of slip energy consumed in proportional control. We also employ an auxiliary holding brake, not shown, to bring the slide to a complete stop and hold it motionless when we desire to stop the press. As is well known in the art, clutch coil 30 and brake coil 28 may be the field windings of a hysteresis, eddy current, magnetic particle, or electro-mechanically actuated friction clutch and brake, or clutch control coil 30 and brake control coil 28 may operate valves to control the pressure applied to a hydraulically actuated friction clutch and brake or operate valves to control the quantity of fluid circulating in hydraulic fluid couplings. The control winding of magnetic amplifier 24 and the control winding of magnetic amplifier 26 are supplied in parallel with biasing current by a bias battery 32 through a biasing resistor 34 and a biasing resistor 36, respectively. Magnetic amplifier 42 has its two output windings connected in a full wave bridge circuit by crystals 43 to produce voltage across load resistor 40. The voltage across load resistor 40 is opposed by the voltage of a battery 38 and the series difference between these two voltages is differentially applied to the control winding of magnetic amplifier 24 and the control winding of magnetic amplifier 26 in series. The output terminals of tachometer generator 10 are shunted by speed control potentiometer 18. Manually adjustable brush 16 of speed control potentiometer 18 taps off a certain portion of the tachometer generator voltage. As the slide moves down, as shown by the slide direction arrow, shaft 8 will turn counterclockwise, as shown by the shaft direction arrow, and the polarity of the tachometer generator voltage will be as shown. One terminal of the control winding of magnetic amplifier 42 is connected to the negative terminal of a reference voltage supplied by a reference battery 44. The positive terminal of reference battery 44 is connected to the normally positive terminal of the tachometer generator. The brush 16 of speed control potentiometer 18 is connected to one contact of a pair of single pole, double throw, relay contacts, indicated generally by the reference character 46. The positive terminal of reference battery 44 is connected to the other contact of relay contacts 46. The arm of the relay contacts 46 is connected to the other terminal of the control winding of magnetic amplifier 42 by a lead network consisting of a resistor 56 shunted by a capacitor 54. Alternator 50 also energizes thyratron 52 through the relay winding 48 connected in the plate circuit. The cathode of thyratron 52 is connected to the manually controlled brush 20 of a second position potentiometer 22 which is shunted by the first position potentiometer 14, the combination being excited by a shunting battery 64. The ram operated brush 12 of first position potentiometer 14 is connected through a lead network, comprising resistor 58 shunted by capacitor 62 in series with resistor 60, which is returned to the cathode of thyratron 52, to the grid of thyratron 52.

In operation, the control winding of magnetic amplifier 24 and the control winding of magnetic amplifier 26 are biased to be at cutoff by current from bias battery 32 which flows downwardly through these control windings. In the absence of current in the control winding of magnetic amplifier 42, about half of maximum voltage will appear across load resistor 40. Thus, magnetic amplifier 42 is normally positioned in a linear region of operation. The voltage supplied by battery 38 is equal and opposite to this voltage across load resistor 40 so that in the absence of current in the control winding of magnetic amplifier 42, no signal is impressed on the control winding of magnetic amplifier 24 and the control winding of magnetic amplifier 26 in series. Assume that the manually operated brush 20 of position potentiometer 22 has been adjusted so that slowdown occurs at the proper point and assume that the brush 16 of speed control potentiometer 18 has been adjusted to the critical speed of the material to be drawn. Let us further assume as a starting point that the slide is at its maximum upward excursion and is now proceeding downwardly. At this point the brush 12 of position potentiometer 14 will be at its clockwise limit, thereby applying a negative voltage to the control grid of thyratron 52 and preventing its firing. The arm of relay contacts 46 will rest in the position shown and, hence, the tachometer generator circuit will be disconnected. Current supplied by reference battery 44 will flow through resistor 56 upwardly through the control winding of magnetic amplifier 42, thereby increasing its output to saturation. Maximum voltage will be developed across load resistor 40 thereby causing current to flow upwardly through the control winding of magnetic amplifier 26 and downwardly through the control winding of magnetic amplifier 24. Magnetic amplifier 26 will be saturated thereby completely energizing clutch control winding 30 and causing the press to operate at full speed. Magnetic amplifier 24 will now rest beyond cutoff and so the brake control winding 28 will remain unenergized. As the ram descends at full speed a large but ineffectual voltage will be developed by tachometer generator 10 across speed control potentiometer 18, and the brush 12 of position potentiometer 14 in rotating counterclockwise will become less negative. For descriptive purposes, let us idealize the characteristics of thyratron 52 and say that it fires when the grid-to-cathode voltage is zero. Position potentiometers 14 and 22 act as a Wheatstone bridge circuit, and when the output voltage between brushes 12 and 20 becomes zero, thyratron 52 will fire, causing current to flow through relay coil 48, which pulls the arm of relay contacts 46 into engagement with the brush 16 of speed control potentiometer 18. With the ram descending at full speed, the voltage between the positive terminal of reference battery 44 and the brush 16 of speed control potentiometer 18 is greater than that of reference battery 44, thereby reversing the current through the control winding of magnetic amplifier 42 and causing it to flow downwardly. This, in turn, causes the brake to be energized and the clutch to be de-energized, thereby rapidly decreasing the velocity of the slide. This system regulates at the point where the voltage tapped across speed control potentiometer 18 is equal to that of reference battery 44 and holds the speed of the descending ram constant. As the ram approaches the limit of its downward excursion, the energization of the clutch will automatically increase, decreasing the slip, to compensate for the otherwise sinusoidal motion of the ram. As the ram reaches its maximum downward excursion, the tachometer speed and voltage drop to zero, thereby saturating magnetic amplifier 26 and completely energizing clutch control winding 30 in an effort to keep the ram speed constant. As the ram moves upwardly, the tachometer polarity reverses from that shown and aids reference battery 44 in completely energizing clutch control winding 30. Consequently, the ram ascends at full speed. As the point of slowdown is passed while the ram is moving upwardly, the output voltage of the bridge circuit including position potentiometers 14 and 20 goes through zero and becomes negative, thyratron 52 ceases conducting, current ceases to flow through relay coil 48, and the arm of relay contacts 46 is released and returns to engagement with the positive terminal of reference battery 44. The tachometer generator circuit is thereby disconnected. The current from reference battery 44 through the control winding of magnetic amplifier 42 keeps the speed of the ram maximum as it continues upwardly, reaches top dead center, begins to descend, and continues downwardly to the point of slowdown.

The lead network comprising resistor 56 and capacitor 54 in conjunction with the resistance of the control winding of magnetic amplifier 42, differentiates the velocity voltage of the tachometer circuit thereby applying a voltage proportional to acceleration to the control winding of magnetic amplifier 42. This derivative control stabilizes the closed loop regulator system which holds the draw speed constant. The lead network comprising resistors 58 and 60 and capacitor 62 differentiates the position output voltage of the Wheatstone bridge circuit, thereby applying a voltage proportional to velocity to the grid of thyratron 52. This derivative control anticipates the point of slow down to allow time for slowing down the slide to critical speed before drawing is commenced. Slowdown anticipation may alternately be obtained by omitting resistor 60 and capacitor 62, by connecting brush 12 to the normally negative terminal of tachometer generator 10 by means of resistor 58, and connecting the grid of thyratron 52 to a tap on speed control potentiometer 18.

The ram operates at full speed up to the point of slowdown and then is braked to the critical speed of the material to be drawn. Critical speed is maintained during draw up to the point where the clutch control coil is fully energized. At this point the ram is operating at full speed. But because of the natural action of the eccentric and pitman, the velocity of the ram will begin to drop below critical speed at this point near bottom dead center. The ram continues at full speed up to the point of slowdown.

It will be seen that we have accomplished the objects of our invention. We have provided a clutch control for power presses in which the speed of the ram is maximum except during the draw operation. During draw the ram speed is regulated and maintained constant despite variation in the resistance of the work. During draw the essentially sinusoidal motion normally imparted by the eccentric and pitman is counteracted to maintain the ram speed constant up to a point near bottom dead center. The speed during draw is conveniently adjusted by a speed control potentiometer. The point of slowdown is conveniently and readily adjusted by a position potentiometer.

It will be understood that certain features and subcombinations are of utility and may be employed without reference to other features and subcombinations. This is contemplated by and is within the scope of our claims. It is further obvious that various changes may be made in detail within the scope of our claims without departing from the spirit of our invention. It is therefore to be understood that our invention is not to be limited to the specific details shown and described.

Having thus described our invention, what we claim is:

1. In a power press having a working slide adapted to be reciprocated, and a clutch and brake for governing the motion of the slide, a clutch and brake control including in combination clutch control means, brake control means, means responsive to the motion of the slide for providing a regulating signal which is a function of the velocity of the slide, and means responsive to the velocity regulating signal for selectively and proportionally actuating the brake control means and the clutch control means thereby to regulate the velocity of the slide.

2. A power press as in claim 1 in which the clutch control means includes a clutch control winding and the brake control means includes a brake control winding.

3. A power press as in claim 1 in which the velocity regulating signal means includes a tachometer generator which provides a voltage proportional to the velocity of the slide.

4. A power press as in claim 1 in which the actuating means includes a magnetic amplifier.

5. A power press as in claim 1 in which the actuating means includes a magnetic amplifier for the brake control means and a magnetic amplifier for the clutch control means in which both magnetic amplifiers are biased to be at cutoff.

6. A power press as in claim 1 including means responsive to the motion of the slide for providing a derivative stabilization signal which is a function of the acceleration of the slide, in which the actuating means is responsive to both the velocity regulating signal and the derivative stabilization acceleration signal.

7. A power press as in claim 1 including means responsive to the motion of the slide for providing a derivative stabilization signal which is a function of the acceleration of the slide, in which the actuating means is responsive to both the velocity regulating signal and the derivative stabilization acceleration signal, and in which the derivative stabilization acceleration signal means includes a resistor shunted by a capacitor.

8. A power press as in claim 1 including means associated with the velocity regulating signal means for adjustably predetermining the regulated velocity of the slide.

9. A power press as in claim 1 including means associated with the velocity regulating signal means for adjustably predetermining the regulating velocity of the slide, in which the velocity adjustment means includes a potentiometer.

10. In a power press having a working slide adapted to be reciprocated, and a clutch and brake for governing the motion of the slide, a clutch and brake control including in combination clutch control means, brake control means, means responsive to the motion of the slide for providing a regulating signal which is a function of the velocity of the slide, means responsive to the velocity regulating signal for selectively and proportionally actuating the brake control means and the clutch control means thereby to regulate the velocity of the slide, means responsive to the motion of the slide for providing a signal which is a function of the displacement of the slide, and means responsive to the displacement signal for initiating the response of the actuating means for initiating the response of the actuating means to the velocity regulating signal thereby to slow down the slide.

11. A power press as in claim 10 in which the clutch control means includes a clutch control coil and the brake control means includes a brake control coil.

12. A power press as in claim 10 in which the velocity regulating signal means includes a tachometer generator which provides a voltage proportional to the velocity of the slide.

13. A power press as in claim 10 in which the actuating means includes a magnetic amplifier.

14. A power press as in claim 10 in which the actuating means includes a magnetic amplifier for the brake control means and a magnetic amplifier for the clutch control means in which both magnetic amplifiers are biased to be at cutoff.

15. A power press as in claim 10 including means responsive to the motion of the slide for providing a derivative stabilization signal which is a function of the acceleration of the slide, in which the actuating means is responsive to both the velocity regulating signal and the derivative stabilization acceleration signal.

16. A power press as in claim 10 including means responsive to the motion of the slide for providing a derivative stabilization signal which is a function of the acceleration of the slide, in which the actuating means is responsive both to the velocity regulating signal and to the derivative stabilization acceleration signal, and in which the derivative stabilization acceleration signal means includes a resistor shunted by a capacitor.

17. A power press as in claim 10 including means associated with the velocity regulating signal means for adjustably predetermining the regulated velocity of the slide.

18. A power press as in claim 10 including means associated with the velocity regulating signal means for adjustably predetermining the regulated velocity of the slide, in which the velocity adjustment means includes a potentiometer.

19. A power press as in claim 10 in which the displacement signal means includes a potentiometer.

20. A power press as in claim 10 in which the initiating means includes a relay.

21. A power press as in claim 10 including means responsive to the motion of the slide for providing a derivative anticipation signal which is a function of velocity of the slide, in which the initiating means is responsive both to the displacement signal and to the derivative anticipation velocity signal.

22. A power press as in claim 10 including means responsive to the motion of the slide for providing a derivative anticipation signal which is a function of the velocity of the slide, in which the initiating means is responsive both to the displacement signal and to the derivative anticipation velocity signal, and in which the derivative anticipation velocity signal means includes a resistor shunted by a capacitor.

23. A power press as in claim 10 including means associated with the displacement signal means for adjustably predetermining the point of initiation of slowdown of the slide.

24. A power press as in claim 10 including means associated with the displacement signal means for adjustably predetermining the point of initiation of slowdown of the slide, in which the point of slowdown adjustment means includes a potentiometer.

References Cited in the file of this patent
UNITED STATES PATENTS

| | | |
|---|---|---|
| 2,740,510 | Berthold | Apr. 3, 1956 |
| 2,747,710 | Smith | May 29, 1956 |

U. S. DEPARTMENT OF COMMERCE
PATENT OFFICE

CERTIFICATE OF CORRECTION

Patent No. 2,816,635     James C. Danly et al.     December 17, 1957

It is hereby certified that error appears in the printed specification of the above numbered patent requiring correction and that the said Letters Patent should read as corrected below.

Column 6, lines 32 and 33, strike out "for initiating the response of the actuating means".

Signed and sealed this 17th day of June 1958.

(SEAL)
Attest:
KARL H. AXLINE

Attesting Officer

ROBERT C. WATSON
Commissioner of Patents